United States Patent [19]

Dillenschneider

[11] 3,759,919

[45] Sept. 18, 1973

[54] COPOLYMERIZATION OF A CONJUGATED DIENE WITH A VINYL AROMATIC COMPOUND

[75] Inventor: Jean-Paul Dillenschneider, Beaumont, France

[73] Assignee: Compagnie Generale des Etablissements Michelin, raison Societe Michelin & Cie, Clermont-Ferrant, France

[22] Filed: Apr. 1, 1971

[21] Appl. No.: 130,498

[30] Foreign Application Priority Data

Apr. 9, 1970 France .............................. 7012942

[52] U.S. Cl.............. 260/83.7, 260/84.3, 260/84.7, 252/431 R
[51] Int. Cl....... C08f 19/06, C08f 19/08, C08f 1/74
[58] Field of Search ..................... 260/94.2 T, 83.7, 260/84.3, 84.7

[56] References Cited
UNITED STATES PATENTS

| | | | |
|---|---|---|---|
| 3,644,313 | 2/1972 | Cheng et al........................ | 260/83.7 |
| 3,254,062 | 5/1966 | Forman.............................. | 260/94.2 |
| 3,294,768 | 12/1966 | Wofford............................. | 260/83.7 |
| 3,330,785 | 7/1967 | Boyd................................. | 268/83.7 |
| 3,410,836 | 11/1968 | Hsieh................................ | 260/83.7 |

*Primary Examiner*—James A. Seidleck
*Attorney*—Brumbaugh, Graves, Donohue & Raymond

[57] ABSTRACT

In the solution copolymerization of a conjugated diene monomer with a vinyl aromatic monomer dissolved in a hydrocarbon solvent reaction medium therefor containing a solubilized organolithium copolymerization initiator, the distribution of the monomers along the macromolecular copolymer chain can be rendered uniform or variably controlled while also reducing the 1,2- or 3,4- addition content of the conjugated diene monomer within the copolymer product molecules in a reproducible manner by conducting the copolymerization in the reaction medium which contains a weakly polar solution of a complex of an aromatic ketone with an alkali metal other than lithium.

9 Claims, No Drawings

COPOLYMERIZATION OF A CONJUGATED DIENE WITH A VINYL AROMATIC COMPOUND

The present invention relates to improvements in the solution copolymerization in a hydrocarbon solvent of a conjugated diene with a vinyl aromatic compound under the influence of an organolithium initiator in order to obtain synthetic rubbers.

As is known, in this type of copolymerization the reactivities of the conjugated diene and vinyl aromatic monomers present with respect to the organo-lithium initiator are generally very different. The result generally is that the amount of the less reactive vinyl aromatic compound present in the copolymer increases as the copolymerization takes place; if the copolymerization is allowed to continue, the macromolecular chains have at one of their ends a terminal block of a polymer of vinyl aromatic compound, while the other end, that at which the copolymerization started, is poor in vinyl aromatic compound.

Such an irregular or non-uniform distribution of the two monomers is unfavorable in an elastomer and results in an increase in the hysteresis loss thereof. It has been attempted heretofore to remedy this. Thus in order to equalize or standardize the rates of polymerization of the monomers, it has been proposed to introduce various highly polar compounds into the polymerization medium, particularly tetrahydrofuran or hexamethyl phosphoro triamide. These compounds improve or even make completely uniform the distribution of the monomers along the macromolecular chains. However, they have an unfavorable action on the microstructure of the copolymer and favor linkages of the vinyl type by the conjugated diene monomer through 1,2- or 3,4- addition thereof.

In order to obtain both a uniform distribution of the monomers and as low a content as possible of linkages of the vinyl type by the 1,2- or 3,4- addition of the conjugated diene monomer, it was then proposed to associate an organic compound of another alkali metal, for instance a potassium or sodium alcoholate, with the organolithium catalyst. This method, however, is effective only in the laboratory and under ideal conditions.

The compounds in question are rather insoluble in the ordinary copolymerization solvents, which by itself is unfavorable. Furthermore, they must be used in very low concentration and therefore in a large amount of dilution and dispersion medium, which results in the inevitable presence of appreciable amounts of impurities; this results in a rapid alteration of the active product the use of which is thus made difficult and leads to very diversified results. In the absence of stable effectiveness and assured reproducibility of the results, the known compounds cannot be employed industrially.

The present invention provides a new solution for the same problem which does not have the drawbacks of the known proposed solutions. It contemplates copolymerizing a conjugated diene with a vinyl aromatic compound, obtaining a copolymer which has a distribution of the monomers along the macromolecular chain which is either uniform or variable but maintained within controlled limits, without any appreciable increase in the number of vinyl linkages by the 1,2- or 3,4- addition of the conjugated diene monomer under the conditions of stability and reproducibility necessary for an industrial process.

The method in accordance with the invention for the solution copolymerization in a hydrocarbon solvent reaction medium of conjugated diene and vinyl aromatic monomer compounds under the influence of an organolithium initiator is characterized by adding a weakly polar solution of a complex formed of an alkali metal other than lithium with an aromatic ketone to the reaction medium By "aromatic ketone" there are understood compounds having a ketone function directly connected to two aromatic rings. These compounds may thus satisfy formulas such as the following:

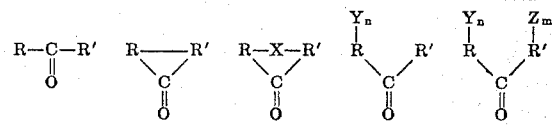

in which:
R and R' are radicals of aryl type, whether substituted or not, as indicated below,
X is a bivalent atom or group such as O, S, $NR_1$, $R_2$ ($R_1$ being a monovalent alkyl or aryl radical, $R_2$ being a bivalent alkyl or aryl radical),
$Y_n$ or $Z_m$ is a group of n or m amount of identical or different substituents, for instance of the type $NR_1R_2$, $OR_1$, $SR_1$, halogen ($R_1$ and $R_2$ being monovalent alkyl and/or aryl radicals), the numbers $n$ and $m$ being whole numbers between 0 and 5.

A very large number of compounds satisfy the above definition. By way of illustration but not of limitation mention may be made of:

1. Ketones of the benzophenone family and similar ketones; phenyl naphthyl ketone, dinaphthyl ketone, ditolyl ketone, as well as their substituted derivatives, for instance chlorobenzophenones, bromobenzophenones, dichloro- or dibromobenzophenones, methyl benzophenones, di-, tri- or tetramethyl benzophenones, methyl ethyl benzophenones, chloromethyl benzophenones, isopropenyl benzophenones, phenyl benzophenones, etc.

2. Fluorenone and its substituted derivatives such as chloro- or bromofluorenone, benzofluorenone, etc.

3. Anthrone-(9) and its substituted derivatives, chloroanthrone, dichloroanthrone, methyl anthrone, dimethyl anthrone, trimethyl anthrone, diethyl anthrone, phenylanthrone, benzylanthrone, etc.

4. 1-9 benzanthrone-(10) and its substituted derivatives.

5. Xanthone and its substituted derivatives, chloroxanthone, methyl xanthone, benzoxanthone, etc.

6. Thioxanthone and its substituted derivatives.

7. Michler's ketone, i.e., 4,4'-bis(N,N'-dimethylamino)-benzophenone, and similar ketones such as 3-dimethyl aminobenzophenone, 4-methylanilinobenzophenone, 4-methylbenzylaminobenzophenone, 3,3'-bis-dimethylaminobenzophenone, 4,4'-bis-diethylaminobenzophenone, 4'-dimethylamino-6-methoxy-3-methyl benzophenone, etc.

8. N-methylacridone, N-phenylacridone and similar compounds.

In all these compounds, a ketone function is connected directly to two aromatic rings. Some of them furthermore have at least one function of ether, thioether or tertiary amine type capable of playing a useful role as indicated below. The different ketones of the type in question give, with the alkali metals, a complex of radical ionic structure to which there can be attributed a formula such as the following formula which applies to the case of benzophenone:

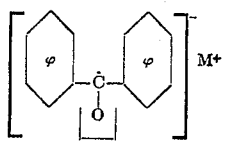

M being the alkali metal.

This complex makes itself known by a very dark and intense color (from blue black to very dark brown) which may furthermore be used for its determination by colorimetry.

The aromatic ketone alkali metal complex is prepared in accordance with the invention in the form of a weakly polar solution. In order not to modify the polarity of the polymerization reaction medium substantially upon the addition of the complex solution, it is advisable to use and preferably prepare the said complex in the form of a weakly polar solution. Weak polarity will be obtained by the presence of at least one function of ether, thioether or tertiary amine type. Two cases may occur:

In the first case, a weakly polar solvent which may advantageously be of the tertiary amine, ether or thioether type is employed for the preparation and use of the alkali metal/aromatic ketone complex. Recourse is had to this solution when the aromatic ketone does not itself contain an ether, thioether or tertiary amine function. By weakly polar solvent there is understood a solvent which is not capable of causing by itself at the concentration at which it is used an increase of more than 5 to 10 points of percentage of linkages of vinyl type in the polymerization of conjugated dienes by means of an organolithium initiator. Tetrahydrofuran which is used ordinarily to prepare and preserve ketyl metals is not a favorable medium for the preservation and use of these complexes because of its strong polarity.

Among solvents which have sufficient polarity to permit the preparation and preservation of the aromatic ketone/alkali metal complexes but insufficient to have a harmful influence on the microstructure of conjugated diene polymers when introduced into the polymerization reaction medium in molar quantity of the same order as the quantity of organolithium catalyst, mention may be made of:

the tertiary amines such as triethyl amine, N,N-dimethyl aniline, N-methyl diphenylamine, N-ethyl dibenzylamine, the mono- or polyaryl ethers such as anisole, phenetole, diphenyl ether, methyl naphthyl ether, the aliphatic ethers and thioethers with sufficiently long aliphatic chains (having a total of at least 6 carbon atoms) such as dibutyl sulfide, and diisobutyl ether.

Numerous weakly polar solvents may be suitable and it is not possible to enumerate all of them. The essential thing is that the radicals connected to the oxygen, sulfur or nitrogen atom be rather heavy; however, the compound must remain liquid at a temperature of about 30°C.

In the second case, as the ketone itself has polar groups (ether, thioether or tertiary amine function), one may employ as solvent a nonpolar solvent such as benzene or cyclohexane, or else — although this does not result in any advantage — a weakly polar solvent as when the ketone has no ether, thioether or amine function. This case is in particular that in which the ketone used is xanthone, Michler's ketone, or N-methyl acridone.

In all cases the essential thing is that the solution of aromatic ketone/alkali metal complex be polar, for this is necessary for the preparation and the solubility of the complex, and that it be not too polar because then, on the one hand, the solution may have an unfavorable action, even in small amount, on the content in the copolymer of linkages of the vinyl type and, on the other hand, the stability of the complex may be decreased. The following examples show that a good compromise can easily be obtained in practice and in various ways.

The essential factor for controlling the distribution of the monomers in the macromolecular chain is the molar ratio between the amount of alkali metal other than the lithium complexed by the aromatic ketone and the lithium included in the organolithium compound forming the catalyst. There is a value of the lithium:alkali metal molar ratio which in each case results in a uniform distribution of the monomers. This value, however, depends on numerous parameters — polymerization temperature, nature of the alkali metal used, nature of the monomers to be polymerized, nature of the aromatic ketone, concentration of the organo-lithium compound. In general, this value is between about 2:1 and about 20:1. Generally, the Li:K mole ratio can be from about 3:1 to about 10:1, taking the above mentioned parameters into due consideration.

In the case of the copolymerization of butadiene or isoprene with styrene at 60°C. with a concentration of butyl lithium of 0.035 pcm (1 pcm = 1 part by weight per 100 parts by weight of monomer) if the benzophenone/potassium complex is used, the Li:K mole ratio should be close to 10:1 in order that the copolymer being formed constantly contains the same proportion of the two monomers. If a benzophenone/sodium complex is used under the same conditions, the Li:Na mole ratio should be close to 2:1 in order to obtain the same result of uniform monomer distribution. The corresponding mole ratio in the cases of lithium to rubidium or to cesium is about 14:1 and 20:1, respectively. If the amount of complex is reduced under the same conditions, then the conjugated diene content of the copolymer which is at first higher than the proportion of diene in the mixture of monomers decreases as the polymerization takes place. The opposite occurs if the amount of complex is increased and if more alkali metal is used than is necessary to equalize the reactivities of the monomers. By regulating the lithium:alkali metal mole ratio one can establish as desired the relative porportions of diene and styrene which are incorporated in the copolymer at the different stages of its polymerization.

In an industrial polymerization the development of the reaction can be easily followed up, controlled or regulated and if desired this can be done automatically. It is sufficient at regular intervals to take samples of the solution of alkali metal/aromatic ketone complex and compare the color thereof with a standard sample or measure the absorbent power thereof for a suitable monochromatic light. This can be done continuously with a spectrophotometric measurement cell interspersed in the distribution circuit of the alkali metal-/aromatic ketone complex solution before its introduction into the polymerization reactor. One can even control the complex solution metering pump by the response of the cell. This is a practical advantage as compared with the previously recommended use of sodium or potassium alcoholates which are difficult to meter continuously.

The polymerization in the presence of the complex solution in accordance with the invention is carried out in the customary manner.

The organolithium initiator is preferably an alkyl lithium compound and more particularly n-butyl lithium. However, one can use any other conventional organic catalyst compound of lithium which is soluble or made soluble in the polymerization reaction medium.

The amount of organolithium initiator to be used is from 0.010 to 0.100 pcm (1 pcm = 1 part by weight per 100 parts by weight of monomer) in the case of n-butyl lithium, or an equivalent molar quantity in the case of another organolithium compound.

The polymerizable or copolymerizable monomers comprise essentially the conjugated dienes and, among them, in particular butadiene and isoprene and, on the other hand, vinyl aromatic compounds, and in particular styrene and vinyl toluene. The proportion of conjugated diene is preferably more than 50 percent by weight.

The polymerization reaction medium can consist of a hydrocarbon or a mixture of hydrocarbons such as saturated linear or branched aliphatic hydrocarbons (e.g., heptane), cycloaliphatic hydrocarbons (e.g., cyclohexane) or aromatic hydrocarbons (e.g., toluene). The monomers/solvent ratio is advantageously of the order of 5 to 20 percent by weight.

The polymerization is preferably carried out at a temperature slightly above room temperature, for instance at a temperature of 50° to 80°C., without this being obligatory.

The following examples indicate by way of illustration different variants of carrying out the invention.

EXAMPLE 1

Benzophenone-potassium complex in solution in triethyl amine (abbreviated TEA) and butadiene-styrene copolymerization.

1. Preparation of the Complex

Into a 250 cc. flask closed by a rubber stopper there are introduced, under an atmosphere of rectified nitrogen:
  200 cc. of purified triethyl amine,
  4.7 g. of metallic potassium in fine flakes,
  7.3 g. of recrystallized, pure benzophenone.

The bottle is agitated for 8 hours in a bath which is thermostatically maintained at 30°C. An intense bluish-black color appears rapidly and soon makes the reaction medium opaque.

At the end of 8 hours the excess potassium is eliminated by transferring the blue solution into another bottle which has been flushed with rectified nitrogen. This solution keeps at room temperature, when protected from light, without substantial degradation.

The determination of potassium in the solution thus obtained is then effected and it is found that its concentration is 0.0235 N.

2. Copolymerization of Butadiene and Styrene

Into a series of 250 cc. bottles there are introduced:
  123 g. of heptane,
  9.225 g. of butadiene,
  3.075 g. of styrene.

Thereupon, in addition to the quantity necessary for destroying the residual impurities, there are introduced 0.040 pcm of n-butyl lithium (1 pcm = 1 part by weight per 100 parts by weight of monomer) in solution in hexane.

In two series (first and third Series) of bottles there are added at the same time as the butyl lithium 2.1 cc. of pure triethyl amine in one of the series and 0.4 cc. in the other series. In three other series (second, fourth and fifth Series) of bottles there are added at the same time as the butyl lithium: 2.04 cc., 0.34 cc. and 0.15 cc. of benzophenone/potassium complex solution in triethyl amine. These concentrations correspond to an Li:K mole ratio of 1.67:1, 10:1 and 22.7:1, respectively.

The polymerization is carried out at a temperature of 60°C. The accompanying table shows, as a function of the polymerization time, on the one hand the percentage conversion and on the other hand the index of refraction $n^{25}{}_D$ and finally, for one of the series, the percentage of styrene and the 1,2 and trans-1,4 content of the polymer. The index of refraction of the polymer obtained gives an approximate measure of the styrene content in the polymer.

As this table shows, with an excess of the complex (second Series), the styrene is incorporated in the polymer proportionally faster than the butadiene; the indices of refraction, which are high at the start, decrease as the polymerization takes place. At the start of reaction, an orange-red color, characteristic of the predominance of polystyryl ions, is developed and its intensity decreases gradually and finally disappears. Wtih a deficit of the complex (fifth Series) the reverse phenomenon is noted; the styrene is incorporated in the polymer more at the end of the reaction and towards 80 percent conversion the orange-red color which is characteristic of the formation of a block of polystyrene appears.

| | 1st series, addition of 2.1 cc. of pure TEA | | 2nd series, addition of 2.04 cc. of benzophenone/K complex in solution in TEA | | 3rd series, addition of 0.4 cc. of pure TEA | | 4th series, addition of 0.34 cc. of benzophenone/K complex in solution in TEA | | | | 5th series, addition of 0.15 cc. of benzophenone/K complex in solution in TEA | |
|---|---|---|---|---|---|---|---|---|---|---|---|---|
| | Percent conv. | $n_D^{25}$ | Percent conv. | $n_D^{25}$ | Percent conv. | $n_D^{25}$ | Percent conv. | $n_D^{25}$ | Percent styr. | Percent 1,2 | Percent conv. | $n_D^{25}$ |
| Time: | | | | | | | | | | | | |
| 10 min | 29.6 | 1.5207 | 44 | 1.5540 | | | 23.2 | 1.5361 | 24 | 17 | 24.1 | 1.5280 |
| 15 min | | | | | 38.4 | 1.5207 | | | | | 37.2 | 1.5297 |
| 20 min | 51 | 1.5216 | 60 | 1.5464 | 47 | 1.5208 | 48 | 1.5370 | 26 | 18 | 46.3 | 1.5294 |
| 30 min | 64 | 1.5225 | 68.3 | 1.5420 | 59.8 | 1.5210 | 65 | 1.5372 | 26 | 18 | 61.3 | 1.5295 |
| 45 min | 74.7 | 1.5240 | 76.5 | 1.5380 | | | 78.3 | 1.5370 | 26 | 18 | | |
| 1 hr | 82 | 1.5251 | 81.5 | 1.5370 | 74 | 1.5226 | 86.5 | 1.5357 | | | 82.5 | 1.5311 |
| 1 hr. 20 min | 85 | 1.5263 | 86.5 | 1.5362 | | | 92.7 | 1.5357 | | | | |
| 1 hr. 40 min | | | 87 | 1.5358 | | | 94.5 | 1.5360 | | | | |
| 4 hrs | 94.5 | 1.5353 | 91 | 1.5347 | | | 97.5 | 1.5357 | 25 | 18 | | |
| 6 hrs | 100 | | 100 | | 98 | 1.5352 | 100 | 1.5362 | | | 100 | 1.5363 |
| Inherent viscosity at the end of the polymerization | 1.52 | | 1.50 | | 1.48 | | 1.55 | | | | 1.45 | |

With an intermediate content of the complex (4th Series) the proportion of styrene in the polymer remains substantially constant for the entire time of the polymerization. Furthermore, the content of 1,2 addition is only 18 percent (while with a catalytic system comprising hexamethyl phosphoro triamide it reaches about 50 percent). The two series (first and third Series) prepared in the presence of pure triethyl amine serve as a standard or control and show that the action on the distribution of the monomers is actually due to the complex benzophenone/potassium association in solution in the triethyl amine and not to the pure triethyl amine.

In the case of the third series (0.4 cc. of triethyl amine), the 1,2 content is about 12 percent, while in the absence of triethyl amine it would be about 8 percent.

EXAMPLE 2

Benzophenone/potassium complex in solution in N,N-dimethyl aniline (abbreviated DMA) and isoprene-styrene copolymerization.

1. Preparation of the Complex

Into a 250 cc. bottle there are introduced, under a nitrogen atmosphere:

50 cc. of N,N-dimethyl aniline distilled under reduced pressure,
1.2 g. of metallic potassium cut into fine flakes,
1,8 g. of pure benzophenone, recrystallized.

The bottle is agitated for 14 hours in a bath maintained thermostatically at 25°C. A deep bluish-black color appears and the reaction medium gradually becomes opaque.

At the end of 14 hours the excess potassium is eliminated by filtration. The content obtained is about 0.125 N potassium. The solution is diluted with cyclohexane and its concentration returned to 0.025 N potassium.

2. Copolymerization of Isoprene and Styrene

There are introduced into a series of 250 cc. bottles, under a nitrogen atmosphere:
  123 g. of heptane,
  9.225 g. of isoprene,
  3.075 g. of styrene,
whereupon there is then introduced, in addition to the amount necessary to destroy the residual impurities, 0.040 pcm of n-butyl lithium as well as:
  either 1.20 pcm of tetrahydrofuran (THF)
  or a variable amount of dimethyl aniline mixed with four times its volume of cyclohexane,
  or else a variable amount of benzophenone/potassium complex dissolved in dimethyl aniline, diluted in cyclohexane, as described above.

a. Copolymerization in the Presence of THF

The copolymerization, carried out at 45°C., gives a copolymer which contains, whatever the percentage of conversion, 25 percent styrene, namely the proportion in which the two monomers have been introduced. The steric configuration of the polyisoprene portion is also constant throughout the reaction and comprises 28 to 29 percent of 3,4 and 29 to 31 percent of trans-1,4.

b. Copolymerization in the Presence of DMA

The copolymerization is carried out at 50°C. for 25 minutes. The following table shows the various data as a function of the quantity of solution of DMA in cyclohexane:

| cc solution of DMA | % conversion in 25 min. | % styrene in the copolymer | %3,4 | % trans-1,4 |
|---|---|---|---|---|
| 0 | 45.0 | 6 | 5 | 21 |
| 0.10 | 44.5 | 6 | 5 | 21 |
| 0.20 | 45.0 | 6 | 5 | 21 |
| 0.30 | 46.5 | 6 | 5 | 21 |
| 0.40 | 41.0 | 6 | 5 | 20 |

The influence of the DMA on the microstructure is practically zero at the concentrations used.

c. Copolymerization in the Presence of the Complex

The reaction temperature is in all cases 50°C. and the following table shows the course of the polymerization for different concentrations.

| Cc. of solution | Time in minutes | Inherent viscosity | Percent conversion | Percent styrene | Percent 3,4 | Percent trans-1,4 |
|---|---|---|---|---|---|---|
| 0.20, molar ratio Li/K=15.5:1 | 15 | | 44 | 20 | 6 | 21 |
| | 23 | | 63.5 | 21 | 6 | 21 |
| | 30 | | 74 | 21 | 6 | 20 |
| | 240 | 1.07 | 100 | 25 | 6 | 21 |
| 0.35, Li/K molar ratio=9:1 | 15 | | 48 | 26 | 6 | 19 |
| | 23 | | 66 | 25 | 6 | 20 |
| | 30 | | 77 | 26 | 6 | 21 |
| | 240 | 1.10 | 100 | 25 | 6 | 22 |
| 0.45, Li/K molar ratio=7:1 | 15 | | 49 | 28 | 6 | 21 |
| | 23 | | 68 | 27 | 6 | 22 |
| | 30 | | 78.5 | 26 | 6 | 21 |
| | 240 | 1.05 | 100 | 25 | 6 | 22 |

The comparison between copolymerization in the presence of DMA but without benzophenone/potassium complex and copolymerization in the presence of DMA and complex clearly shows that the complex is responsible for a percentage of styrene in the polymer which is higher from the very start of the reaction and varies within narrower limits during the reaction.

The effect of the complex is practically nil on the steric configuration. It is seen that for an Li/K molar ratio close to 10:1, the variation in percentage of styrene is the smallest. Finally, it is noted that the complex increases the rate of polymerization.

Finally, the contents of 3,4 and trans-1,4 are definitely less than when tetrahydrofuran is used.

EXAMPLE 3

Benzophenone/potassium complex in solution in diphenyl ether; copolymerization of butadiene/styrene and isoprene/styrene.

1. Preparation of the Complex

There are introduced into a 250 cc. bottle, under a nitrogen atmosphere:
  50 cc. of diphenyl ether, previously distilled under vacuum,
  1.4 g. of potassium,
  0.9 g. of benzophenone.

The potassium is melted by placing the bottle in an oven at 70°C. and then vigorously agitating the bottle so as to divide the liquid potassium into very fine droplets and allowing it to cool at room temperature while agitating. The potassium solidifies in very finely divided state. The agitation of the bottle is continued for 14 hours at room temperature. The complex is formed, giving an intense color. The solution is then filtered to eliminate the excess metallic potassium. It is then titrated and the concentration obtained is 0.083 N potassium. It is then diluted by adding 400 percent benzene, its concentration being brought down to 0.0165 N. This dilute solution is used to copolymerize butadiene or isoprene with styrene.

2. Copolymerization of Butadiene and Styrene

One proceeds in the same manner as previously in 250 cc. bottles into which there are introduced under a nitrogen atmosphere:

123 g. of heptane,
9.225 g. of butadiene
3.075 g. of styrene.

Thereupon there is introduced in addition to the amount necessary to purify the reaction medium, 0.020 pcm of n-butyl lithium in solution in heptane, as well as possibly either diphenyl ether or some prepared complex solution.

The following table gives a comparison of the results obtained for polymerization at 60°C.:

|  | Time (min.) | % conversion | % styrene incorporated | % 1,2 | % trans-1,4 |
|---|---|---|---|---|---|
| BuLi used alone | 25 | 42 | 2 | 8 | 49 |
| BuLi+0.05 cc. diphenyl ether | 25 | 42.5 | 2 | 8 | 50 |
| BuLi+0.25 cc. of complex solution Li/K=10:1 | 15 | 30 | 23 | 12 | 50 |
|  | 25 | 47.5 | 24 | 12 | 49 |
|  | 50 | 72.5 | 25 | 12 | 49 |
|  | 300* | 99 | 25 | 12 | 50 |

*Inherent viscosity: 2.25.

The action of the diphenyl ether used by itself is nil, as when used in equivalent quantity to that which serves as solvent for the benzophenone/potassium complex. When this complex is used, a remarkable constancy of the content of styrene is noted. Moreover, if the amount of 1,2 addition content is increased, this amount remains at a low level, comparable to the amount which is observed with butyl-lithium used alone.

3. Copolymerization of Isoprene and Styrene

One proceeds in the same manner as above, except that 11.07 g. of isoprene and 1.23 g. of styrene are used, and that the polymerization is carried out at 50°C.

The following table gives a comparison of the results obtained:

|  | Time (min.) | % conversion | % styrene incorporated | % 3,4 | % trans-1,4 |
|---|---|---|---|---|---|
| BuLi used alone | 25 | 37 | 2.5 | 5 | 15 |
| BuLi+0.05 cc. diphenyl ether | 25 | 38 | 2.5 | 5 | 16 |
| BuLi+0.25 cc. of complex solution Li/K=10:1 | 11 | 33 | 10.5 | 6 | 15 |
|  | 17 | 44 | 10 | 7 | 16 |
|  | 22 | 50 | 10 | 6 | 16 |
|  | 30 | 61 | 9.5 | 7 | 17 |
|  | 240* | 96 | 10 | 6 | 15 |

*Inherent viscosity=1.80

In the case of isoprene/styrene, the same conclusions can be formulated as in the case of butadiene/styrene. The complex, however, produces an increase of the amount of 3,4 addition content which is even less than in the case of butadiene/styrene.

EXAMPLE 4

Michler's ketone/potassium complex in solution in benzene. Butadiene/styrene copolymerization.

1. Preparation of the Complex 0.4 g. of metallic potassium are introduced into a 250 cc. bottle under a nitrogen atmosphere. The stoppered bottle is placed in an oven at 80°C. so as to melt the potassium which is then spread out in a thin layer on the largest surface possible by shaking the bottle. A solution of 0.95 of Michler's ketone in 50 cc. of benzene is then introduced with the use of a syringe. The bottle is then agitated for 12 hours at room temperature. The bluish-black solution obtained is then filtered and titrated. The content obtained is 0.05 N potassium.

2. Copolymerization of Butadiene and Styrene

Into the same 250 cc. bottles as in the preceding examples there are introduced 123 g. of cyclohexane and 12.3 g. of a mixture of butadiene and styrene containing 25 percent styrene. Thereupon there is introduced, in addition to the amount necessary to destroy the residual impurities, 0.035 pcm of n-butyl lithium and finally 0.133 cc. of the complex preparation solution, which corresponds to an Li:K molar ratio of 10:1.

The reaction is carried out at 60°C. and the results are given below:

| Time (minutes) | % conversion | % styrene incorporated | % 1,2 | % trans-1,4 |
|---|---|---|---|---|
| 10 | 32 | 25 | 12 | 54 |
| 14 | 42 | 25 | 12 | 54 |
| 240 | 100 | 25 | 12 | 54 |

Due to the addition of the complex, the incorporation of the styrene is entirely uniform, at the cost of a light increase in the amount of 1,2 (12 percent instead of 8 percent) and of trans-1,4 (54 percent instead of 50 percent) addition contents.

EXAMPLE 5

Benzophenone/sodium complex in solution in anisole. Butadiene/styrene copolymerization.

1. Preparation of the Complex 4 g. of sodium wire are introduced into a bottle under a nitrogen atmosphere, followed by 0.9 g. of benzophenone in 50 cc. of anisole. At the end of 4 hours at room temperature with agitation there is obtained a dark green solution which is filtered and titrated. The sodium concentration is 0.086 N.

2. Copolymerization of Butadiene and Styrene

There are introduced one after the other into bottles under nitrogen atmosphere:

123 g. of cyclohexane,
9.225 g. of butadiene,
3.075 g. of styrene,
0.035 pcm of n-butyl lithium
0.4 cc. of the benzophenone/sodium complex solution obtained, which corresponds to an Li/Na atomic ratio of 1.96:1.

Polymerization is effected at 60°C.

The following table gives the results obtained:

| Time (minutes) | % conversion | % styrene incorporated | % 1,2 | % trans-1,4 |
|---|---|---|---|---|
| 15 | 57.5 | 24 | 27 | 46 |
| 20 | 67.7 | | | |
| 270 | 100 | 26 | 28 | 46 |

The incorporation of the styrene is entirely uniform; on the other hand, the percentage of 1,2 addition content is less favorable than in the other examples.

EXAMPLE 6

Benzophenone-Potassium complex dissolved in anisole. Butadiene/vinyl toluene copolymerization.

1. Preparation of the Complex

The same procedure is used as in Example 4, contacting 0.2 g. of metallic potassium and 0.9 g. of benzophenone in 50 cc. of anisole for 20 hours at room temperature. It is then filtered and titrated. The resultant solution has a concentration of 0.07 N potassium. It is diluted with anisole to reduce the concentration to 0.0195 N.

2. Copolymerization of Butadiene and Vinyl Toluene

There are introduced in succession into bottles:
123 g. of cyclohexane,
9.225 g. of butadiene,
3.075 g. of vinyl toluene (mixture containing 30 percent para-methyl styrene and 70 percent meta-methyl styrene),
0.035 pcm of active n-butyl lithium,
0.66 cc. of prepared solution, namely an Li/K atomic ratio of 5.2:1.

The polymerization is effected at 60°C. The results obtained are:

| Time (min.) | % conversion | % vinyl toluene incorporated | % 1,2 | Inherent Viscosity | % trans-1,4 |
|---|---|---|---|---|---|
| 15 | 39 | 25 | 18 | | 52 |
| 20 | 49 | | | 1.22 | |
| 45 | 77 | | | 1.61 | |
| 90 | 89 | 26 | 19 | | 52 |
| 300 | 94 | 25 | 19 | | 52 |

EXAMPLE 7

Fluorenone/potassium complex dissolved in anisole. Butadiene/styrene copolymerization.

1. Preparation of the Complex

The same procedure is used as in the preceding examples, contacting 0.2 g. of metallic potassium and 0.9 g. of fluorenone in solution in 50 cc. of anisole for 18 hours with agitation. Filtration and titration are effected. The concentration obtained is 0.072 N potassium. Dilution is effected with anisole so as to reduce the concentration of 0.0115 N.

2. Copolymerization of Butadiene and Styrene

There are introduced one after the other into bottles:
123 g. of cyclohexane,
9.225 g. of butadiene,
3.075 g. of styrene,
0.035 pcm of active n-butyl lithium
0.82 cc. of prepared solution (namely an Li/K atomic ratio of 7.14:1).

Polymerization is effected at 60°C.
The following table gives the results obtained:

| Time (min.) | % conversion | % styrene incorporated | % 1,2 | % trans-1,4 |
|---|---|---|---|---|
| 9 | 29 | | | |
| 15 | 52.5 | 25 | 13 | 53 |
| 30 | 82.5 | | | |
| 240 | 100 | 25 | 13 | 54 |

EXAMPLE 8

Benzophenone/rubidium complex dissolved in anisole. Butadiene/styrene copolymerization.

1. Preparation of the Complex

The same procedure is used as in the preceding examples, contacting 0.5 g. of rubidium (previously melted to divide it into fine particles by agitation as in the case of the potassium of Example 3) and 1.2 g. of benzophenone in 65 cc. of anisole for 1 hour at room temperature, with agitation. Filtration and titration are effected. The solution obtained has a concentration of 0.075 N rubidium. It is diluted with anisole to reduce the concentration to 0.0143 N.

2. Copolymerization of Butadiene and Styrene

There are introduced in succession into bottles:
123 g. of cyclohexane,
9.225 g. of butadiene,
3.075 g. of styrene,
0.035 pcm of active n-butyl lithium (in addition to the amount necessary to destroy the residual impurities of the reaction medium),
0.33 cc. of the prepared complex solution (namely an Li/Rb mole ratio of 14.3:1).

Polymerization is effected at 60°C.
The following table gives the results obtained:

| Time (min.) | % conversion | Index of refraction $n^{25}_D$ | % styrene incorporated | % 1,2 | % trans-1,4 |
|---|---|---|---|---|---|
| 8 | 19.9 | 1.5362 | | | |
| 13 | 41.7 | 1.5358 | 25 | 12 | 53 |
| 18 | 58.1 | 1.5360 | 25 | 12 | 53 |
| 360 | 100 | 1.5356 | 25 | 13 | 54 |

EXAMPLE 9

Benzophenone-cesium complex dissolved in anisole. Butadiene/styrene copolymerization.

1. Preparation of the Complex

The same procedure is used as in the preceding examples, contacting 1 g. of cesium (previously melted for division into fine particles by agitation) and 1.4 g. of benzophenone dissolved in 75 cc. of anisole for 1 ½ hr. at room temperature, with agitation. Filtration and titration are effected. The solution obtained has a concentration of 0.067 N cesium. It is dilutd with anisole to reduce the concentration to 0.0115 N.

2. Copolymerization of Butadiene and Styrene

There are introduced in succession into bottles:
123 g. of cyclohexane,
9.225 g. of butadiene
3.075 g. of styrene,
0.035 pcm of active n-butyl lithium (in addition to the amount necessary to destroy the residual impurities of the reaction medium),
0.29 cc. of the prepared complex solution (namely an Li/Cs mole ratio of 20.2:1).

Polymerization is effected at 60°C.
The following table shows the results obtained:

| Time (min.) | % conversion | Index of refraction $n^{25}_D$ | % styrene incorporated | % 1,2 | % trans-1,4 |
|---|---|---|---|---|---|
| 8 | 33.5 | 1.5370 | 26 | | |
| 13 | 49.5 | 1.5355 | 25 | 11 | 50 |
| 18 | 61.5 | 1.5356 | 25 | | |
| 1,080 | 100 | 1.5360 | 25 | 12 | 50 |

In the above examples, the determination of alkali metal was effected in aqueous medium by means of hydrochloric acid in the presence of phenolphthalein. It was found subsequently that this method of determination gave alkali metals content which were systematically too low, the error possibly reaching 30 percent as compared with the determination in acetic acid medium by means of perchloric acid in the presence of crystal violet.

It results from this that the lithium/potassium, lithium/sodium, lithium/rubidium and lithium/cesium mole ratios which give a uniform distribution of the monomers, in the case of the copolymerization of butadiene or isoprene with styrene at 60°C., with a butyl-lithium concentration of 0.035 pcm, are actually close to 7:1, 1.8:1, 10:1 and 15:1, respectively. The essential thing does not reside in the precise value but in the existence of these mole ratios which moreover depend on the copolymerization conditions.

It will be appreciated that various modifications and changes may be made in the process of the invention in addition to those pointed out above by those skilled in the art without departing from the essence of the invention and that accordingly the invention is to be limited only within the scope of the appended claims.

What is claimed is:

1. In the process for the solution copolymerization of a conjugated diene monomer with a monovinyl aromatic monomer dissolved in a hydrocarbon solvent reaction medium therefor containing a solubilized organolithium copolymerization initiator, the improvement which comprises conducting the copolymerization in the reaction medium which contains a weakly polar solution of a stable complex of radical ionic structure formed by the reaction of an aromatic ketone having the ketone function connected directly to two aromatic rings with an alkali metal other than lithium dissolved in a solvent therefor, the mole ratio of lithium to the other alkali metal being a value which is from about 2:1 to about 20:1 and which provides a uniform distribution of said monomers along the macromolecular copolymer chain.

2. The process as defined by claim 1 wherein the weak polarity of the solution of the complex is imparted thereto by the presence therein of an ether, thioether or tertiary amine function contained in the aromatic ketone moiety of the complex or in the solvent for the complex.

3. The process as defined by claim 2 wherein the solvent for the complex is a weakly polar ether, thioether or tertiary amine compound.

4. The process as defined by claim 2 wherein the aromatic ketone moiety of the complex contains an ether, thioether or tertiary amine function and the complex is dissolved in a nonpolar or a very weakly polar solvent therefor.

5. The process as defined by claim 1 wherein the solvent for the complex is of a nature and in a quantity such that in the absence of the complex there is not produced in the copolymer an increase of more than 5 to 10 percentage points of 1,2 or 3,4 addition content.

6. The process as defined by claim 1 wherein the weakly polar solution of the complex is a complex of benzophenone with potassium dissolved in a weakly polar tertiary amine, ether or thioether solvent therefor.

7. The process as defined by claim 1 wherein the weakly polar solution of the complex is a complex of fluorenone with potassium dissolved in a weakly polar tertiary amine, ether or thioether solvent therefor.

8. The process as defined by claim 1 wherein the weakly polar solution of the complex is a complex of Micheler's ketone with potassium dissolved in benzene.

9. The process as defined by claim 1 wherein the other alkali metal is potassium and the mole ratio of lithium to potassium is from about 3:1 to about 10:1.

* * * * *

UNITED STATES PATENT OFFICE
CERTIFICATE OF CORRECTION

Patent No. 3,759,919         Dated   September 18, 1973

Inventor(s)  Jean-Paul Dillenschneider

It is certified that error appears in the above-identified patent and that said Letters Patent are hereby corrected as shown below:

On the face of the patent, column 1, lines 6-8, after "Assignee:", "Compagnie Generale des Etablissements Michelin, Raison Societe Michelin & Cie" should read -- Compagnie Generale des Etablissements Michelin, Raison Sociale Michelin & Cie --. Columns 5 and 6, the table appearing at the bottom of the page should appear as shown on the attached sheet.

Signed and sealed this 26th day of March 1974.

(SEAL)
Attest:

EDWARD M. FLETCHER, JR.
Attesting Officer

C. MARSHALL DANN
Commissioner of Patents

| Time | 1st Series: Addition of 2.1 cc. of pure TEA | | 2nd Series: Addition of 2.04 cc. of benzophenone/K complex in solution in TEA | | 3rd Series: Addition of 0.4 cc. of pure TEA | | 4th Series: Addition of 0.34 cc. of benzophenone/K complex in solution in TEA | | | | 5th Series: Addition of 0.15 cc. of benzophenone/K complex in solution in TEA | |
|---|---|---|---|---|---|---|---|---|---|---|---|---|
| | % conv. | $n^{25}_D$ | % conv. | $n^{25}_D$ | % conv. | $n^{25}_D$ | % conv. | $n^{25}_D$ | % styr. | % 1,2 | % trans 1,4 | % conv. | $n^{25}_D$ |
| 10 min. | 29.6 | 1.5207 | 44 | 1.5540 | | | 23.2 | 1.5361 | 24 | 17 | 48 | 24.1 | 1.5280 |
| 15 | | | | | | | | | | | | | |
| 20 | 51 | 1.5216 | 60 | 1.5464 | 38.4 | 1.5208 | 48 | 1.5370 | 26 | 18 | 49 | 37.2 | 1.5297 |
| 30 | 64 | 1.5225 | 68.3 | 1.5420 | 47 | 1.5208 | 65 | 1.5372 | 26 | 18 | 48 | 46.3 | 1.5294 |
| 45 | 74.7 | 1.5240 | 76.5 | 1.5380 | 59.8 | 1.5210 | 78.3 | 1.5370 | 26 | 18 | 48 | 61.3 | 1.5295 |
| 1 hr. | 82 | 1.5251 | 81.5 | 1.5370 | 74 | 1.5226 | 86.5 | 1.5357 | | | | 82.5 | 1.5311 |
| 1 hr. 20 min. | 85 | 1.5263 | 86.5 | 1.5362 | | | 92.7 | 1.5357 | | | | | |
| 1 hr. 40 min. | | | 87 | 1.5358 | | | 94.5 | 1.5360 | 25 | 18 | 49 | | |
| 4 hrs. | 94.5 | 1.5353 | 91 | 1.5347 | 98 | 1.5352 | 97.5 | 1.5357 | | | | | |
| 6 hrs. | 100 | | 100 | | | | 100 | 1.5362 | | | | 100 | 1.5363 |
| Inherent viscosity at the end of the polymerization | 1.52 | | 1.50 | | 1.48 | | 1.55 | | | | | 1.45 | |